(12) United States Patent
Sankrithi

(10) Patent No.: US 6,616,099 B2
(45) Date of Patent: Sep. 9, 2003

(54) FLOOR BIN SUPPORTED ARMREST FOR AIRCRAFT

(75) Inventor: Mithra M. K. V. Sankrithi, Federal Way, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/982,367

(22) Filed: Oct. 17, 2001

(65) Prior Publication Data

US 2003/0071507 A1 Apr. 17, 2003

(51) Int. Cl.$^7$ ............................................. B64D 11/06
(52) U.S. Cl. ............................. 244/118.6; 244/122 R
(58) Field of Search ........................... 244/118.5, 118.6, 244/122 R, 118.1

(56) References Cited

U.S. PATENT DOCUMENTS

| | | |
|---|---|---|
| 5,104,187 A | 4/1992 | Fischer et al. |
| 5,562,331 A | 10/1996 | Spykerman et al. |
| 5,752,673 A * | 5/1998 | Schliwa et al. ............ 244/118.6 |
| 5,816,650 A | 10/1998 | Lucas, Jr. |
| 5,845,965 A | 12/1998 | Heath et al. |
| 6,000,659 A * | 12/1999 | Brauer .................... 244/118.6 |
| 6,012,679 A | 1/2000 | Auestad |
| 6,264,273 B1 | 7/2001 | Waters, Sr. |
| 6,273,365 B1 * | 8/2001 | Hiesener et al. ......... 244/118.1 |

OTHER PUBLICATIONS http://www.bombardier.com/en/3_0/3_2/3_2_5/img/i3_multi3.jpg.*
http://www.bombardier.com/en/3_0/3_2/3_2_5/3_2_5.jsp?niveau1=5.*

* cited by examiner

Primary Examiner—Charles T. Jordan
Assistant Examiner—Timothy D. Collins
(74) Attorney, Agent, or Firm—DiPinto & Shimokaji, P.C.

(57) ABSTRACT

An apparatus and method is disclosed for increasing available space in an aircraft cabin cross section to improve passenger comfort. Use of one floor bin supported armrest on each side of the aircraft's cross section, rather then conventional seat supported armrest as are provided conventionally elsewhere, permits use of wider seats and/or aisles. Use of floor bin supported armrests also provides the added benefit of increasing the storage volume of floor bins. The apparatus and method for increasing available cross sectional space can also be implemented on other passenger conveyance means, such as buses, trains, vans, or the like, having floor storage bins on the outboard (away-from-aisle) sides of seating units.

19 Claims, 4 Drawing Sheets

FLOOR BIN SUPPORTED ARMREST FOR AIRCRAFT

BACKGROUND OF THE INVENTION

The present invention generally relates to apparatus and methods for accommodating passengers in aircraft and, more specifically, to apparatus and methods for passenger seating arrangements which enable wider seats or aisles through the use of floor bin supported armrests rather than seat supported armrests for passengers seated adjacent to floor bins in aircraft cabins.

Space is a precious and highly valued commodity in a passenger aircraft cross section. One way to increase space is by increasing the cross sectional size of an aircraft, but if that becomes too large, it adds to undesirable empty weight and drag of the aircraft, and significantly increases costs. Within a cross section which is optimized for weight and drag, the challenge is to fit as many passengers as possible, while also maximizing the passenger comfort provided by the seats. For example, FIG. 1 is a cross sectional view of a typical upper deck 10 of a Boeing 747 type passenger aircraft. As illustrated, six abreast economy-class seats are provided by means of two triple seating units 14, including armrests 18, on either side of a single aisle 16. For a typical economy class installation, the upper deck will have six seats 12 each with a 17.2 inch seat bottom width 26 (seat bottom width is an industry measure of passenger comfort), 2 inch wide armrests 24, and a 17 inch wide aisle 22. Floor storage bins 20, placed on the cabin floor 13 adjacent the aircraft side wall 11, and overhead storage bins 28, are also typically provided for storage of passenger carry on luggage.

In the past there have been numerous concepts developed to address and improve passenger comfort on aircraft, and other passenger conveyance means, such as automobiles, buses, and the like. One approach to increasing seat bottom width is to decrease aisle width. The result, however, is tighter and more uncomfortable aisles, particularly from the standpoint of servicing aircraft passengers using standard food and beverage carts.

In one design shown in U.S. Pat. No. 6,264,273, there is disclosed an armrest, which opens and closes to provide a storage compartment, for use by pilots of small aircraft that are not equipped with center armrests. The armrest also incorporates a cup holder and a map holder and is designed to address the problem of fatigue as well as comfort. It can be used for aircraft having a raised center console or a flat floor. The armrest concept, however, does not address the problem associated with inadequate seat bottom width.

Similarly, U.S. Pat. No. 5,562,331 provides a storage compartment for use between two seats of a vehicle. It has a base configured for connection to the vehicle and a cover shaped for comfortably supporting a person's arm. Also incorporated therein is space for supporting loose items as well a cup holder. Again the concept does not address the problem associated with inadequate seat bottom width.

A technique used to provide wider seats for aircraft involves use of convertible seats. U.S. Pat. No. 6,012,679 to the assignee of the present invention, discloses a means whereby selected seat rows for wide body aircraft have seat groups that expand or contract to change the number of seats in a row and the seat width. Conversion is accomplished with all seat components remaining attached to their respective frames, so that no detachable units have to be stowed. The invention only works on specific cross sections under specific load factor conditions and involves substantial weight and cost penalties.

As can be seen, there is a need for an improved apparatus and method which provides wider seats and/or aisles for aircraft passenger seating comfort within a given cross section without sacrificing other passenger comfort elements and without the need to incur substantial weight, drag, and cost penalties.

SUMMARY OF THE INVENTION

In one aspect of the present invention, there is disclosed an aircraft passenger abreast seating arrangement, comprising a triple passenger abreast seating unit with seat mounted armrests on both sides of the two inboard seats and on the inboard side of the outboard seat. A floor storage bin, which incorporates one armrest on the inboard upper corner, is located between the outboard seat and the outboard internal side wall of a passenger aircraft's cabin. Use of the floor storage bin armrest provides about two inches of additional usable width on each side of an aircraft's cross section, allowing an increase in seat bottom width as well as an increase in aisle width.

In another aspect of the present invention, there is disclosed an aircraft passenger abreast seating arrangement, comprising: a triple passenger abreast seating unit; a seat mounted armrests on all but the outboard side of the outboard seat of said triple passenger abreast seating unit; and one armrest mounted on the inboard upper corner of a floor mounted storage bin for use by the passenger occupying the outboard seat of said triple abreast seating unit. Use of the inventive floor mounted storage bin armrest provides additional usable width on each side of an aircraft's cross section, allowing increased seat bottom and aisle widths.

In yet another aspect of the present invention, there is disclosed a passenger abreast seating arrangement, comprising a plurality of seats including seat mounted armrests on all but the outboard side of the outboard seat. One armrest is mounted on a floor storage bin for use by the passenger occupying the outboard seat of the passenger abreast seating unit, thus providing additional usable width on each side of a passenger vehicle's cross section, allowing increased seat bottom and aisle width.

In yet another aspect of the present invention, there is disclosed a method of increasing the usable width on each side of an aircraft's cross section, by means of the following steps: mounting passenger armrests on both sides of each seat of a triple passenger abreast seating unit except for the outboard side of the outboard seat; mounting one armrest on the outboard upper corner of a floor mounted storage bin adjacent the outboard seat of said triple abreast seating unit; providing additional usable width on each side of an aircraft's cross section by eliminating one seat mounted armrest, thus allowing an increase in seat bottom width as well as an increase in aisle width.

These and other features, aspects and advantages of the present invention will become better understood with reference to the following drawings, descriptions and claims.

showing a floor storage bin supported armrest with the bin lid opened; and

Figure 5:
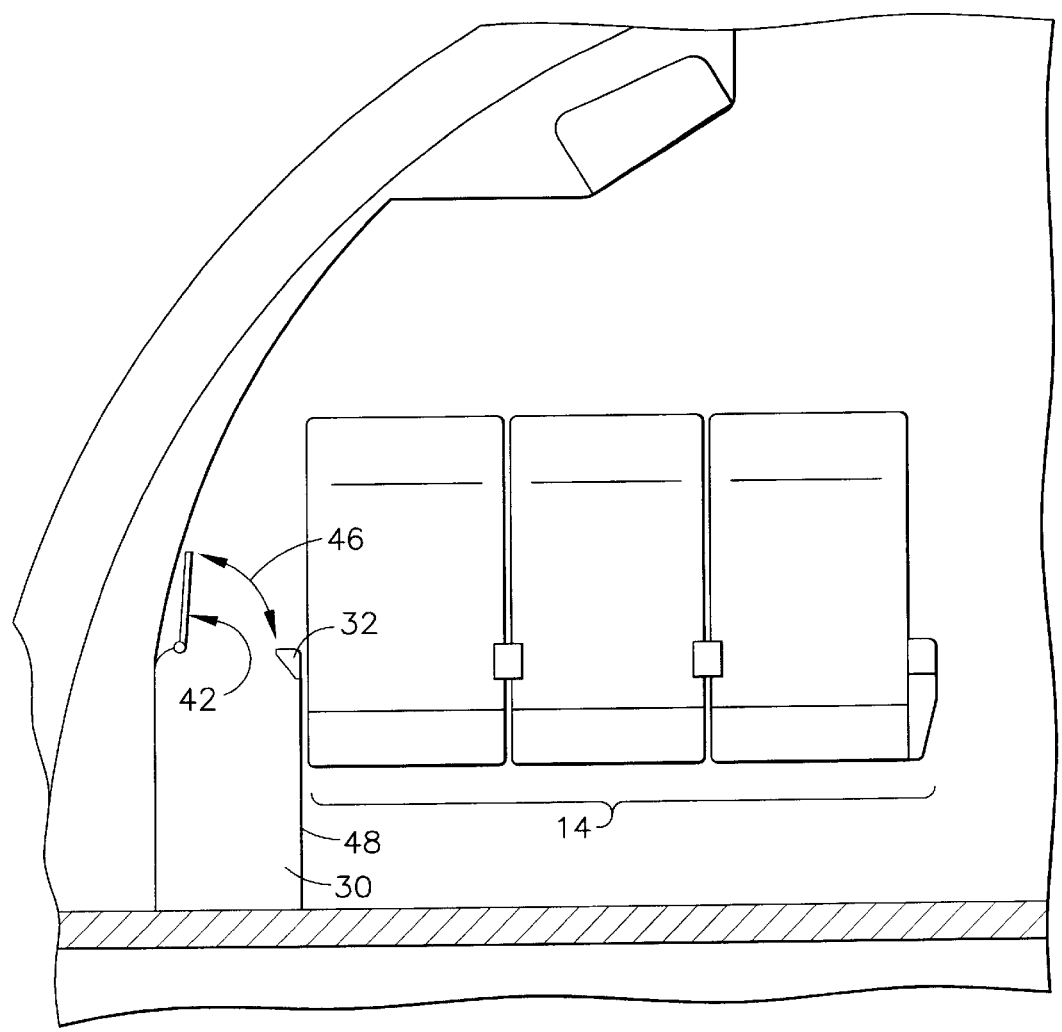

FIG. 5 is yet another magnified cross sectional view of a Boeing 747 upper deck showing an alternate embodiment of the floor storage bin supported armrest.

DETAILED DESCRIPTION OF THE INVENTION

The present invention generally provides an innovative way to enable increased comfort and seat bottom width, without decreasing aisle width, for seating arrangements such as the upper deck of a Boeing 747, or other similar types of passenger aircraft, having floor mounted storage bins on the outboard (away-from-aisle) sides of the seating units. This is unlike some prior art, which can sacrifice other aspects of passenger comfort, such as aisle width, and/or can result in substantial weight and cost penalties.

Figure 1:
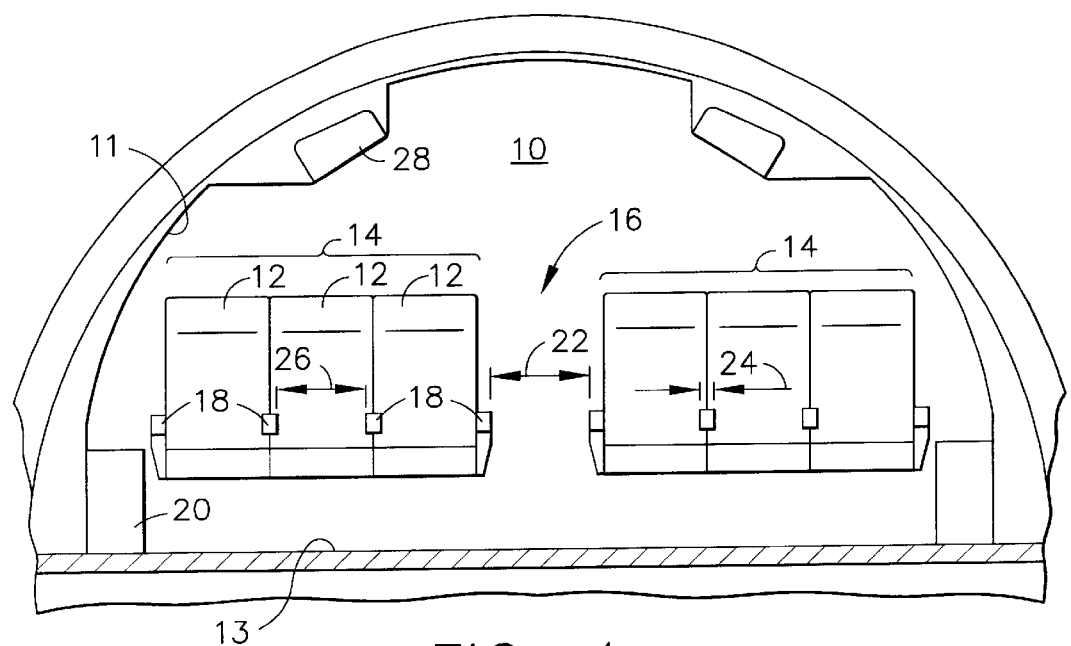
FIG. 1 is a cross sectional view of a Boeing 747 upper deck showing a typical prior art seating arrangement.
Figure 2:
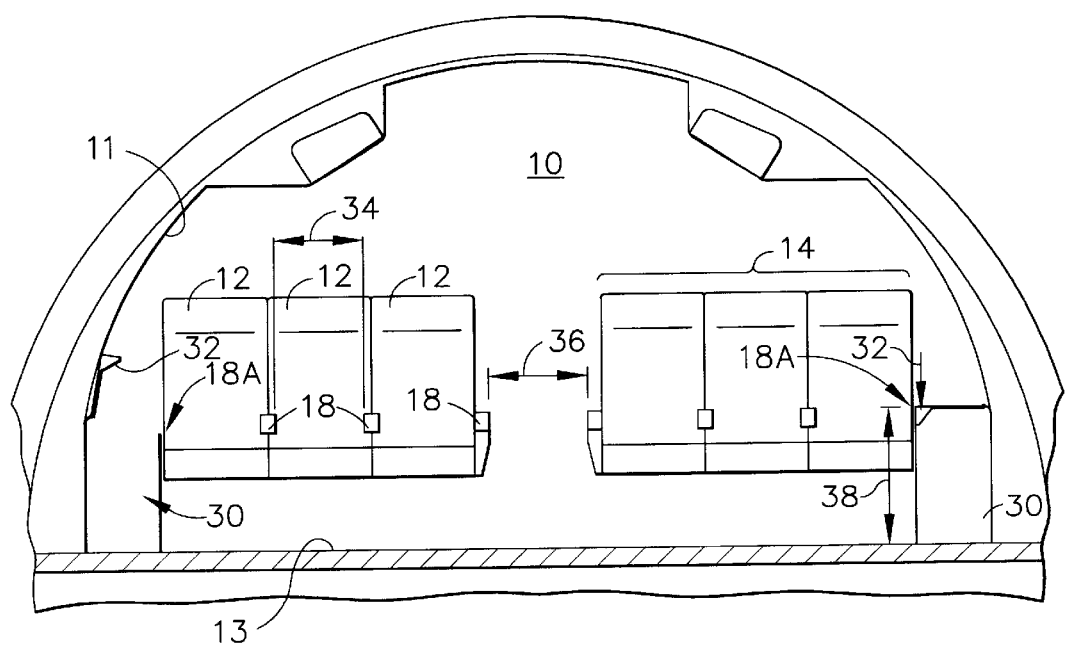
FIG. 2 is a cross sectional view of a Boeing 747 upper deck showing the inventive seating arrangement.

Referring again to the accompanying drawings (in which like reference numerals indicate like parts throughout several views), and in particular to FIG. 2, there is shown a cross sectional view of a Boeing 747 upper deck illustrating the inventive seating arrangement, wherein the conventional outermost armrests 18A have been eliminated from the triple seating units 14, which are installed inboard of sidewall 11 which slopes inwardly with increasing height above cabin floor 13. Instead, the floor mounted outboard floor storage bins 30 may be made taller, and the inboard upper floor storage bin 30 corners may incorporate floor bin mounted armrests 32 by the addition of suitable cushioning and/or contouring commonly employed in the trade. By eliminating the outboard armrests 18A, which are approximately two inches wide, and incorporating floor bin mounted armrests 32, increased seat bottom widths 34 of about 18 inches may be achievable, and the aisle width 36 may also be increase to about 18 inches. An added benefit of this embodiment may be an increase in the floor bin height 38 to about 24 inches (from a previous height of about 18 inches), thus correspondingly increasing the floor storage bin's 30 volume for the benefit of passengers who may store personal belongings therein.

Figure 3:
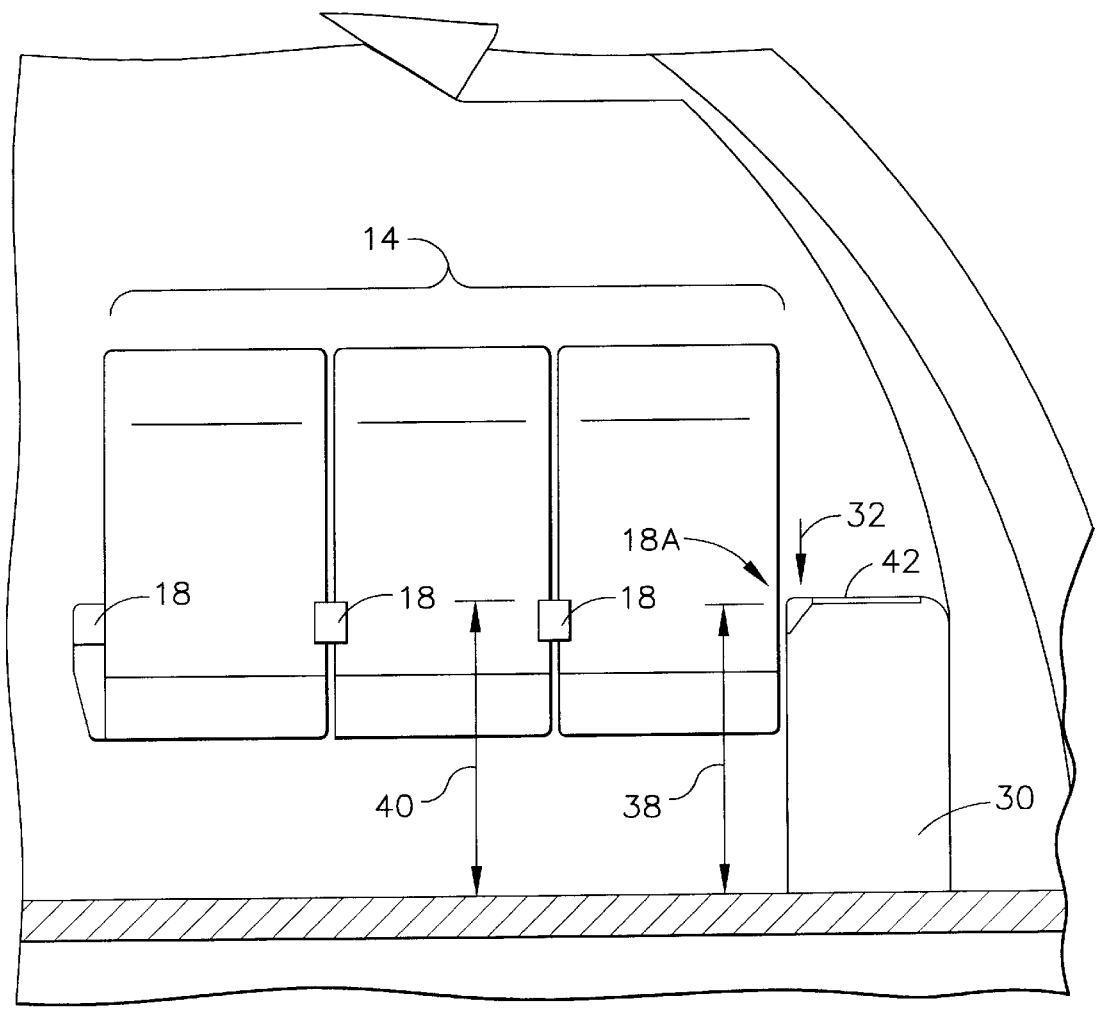
FIG. 3 is a magnified cross sectional view of a Boeing 747 upper deck showing a floor storage bin supported armrest with the bin closed.

Referring now to FIG. 3, there is shown a magnified cross sectional view of a Boeing 747 upper deck showing the right side triple seating unit 14, including three conventionally configured armrests 18. The conventional fourth armrest 18A has been removed, and replaced by a floor bin mounted armrest 32, shown in the floor bin lid 42 closed position. A taller floor storage bin 30 (having a floor bin height 38 of about 23.5 inches) may be achieved in order to maintain the same armrest height 40 as is provided for conventional armrests 18.

Figure 4:
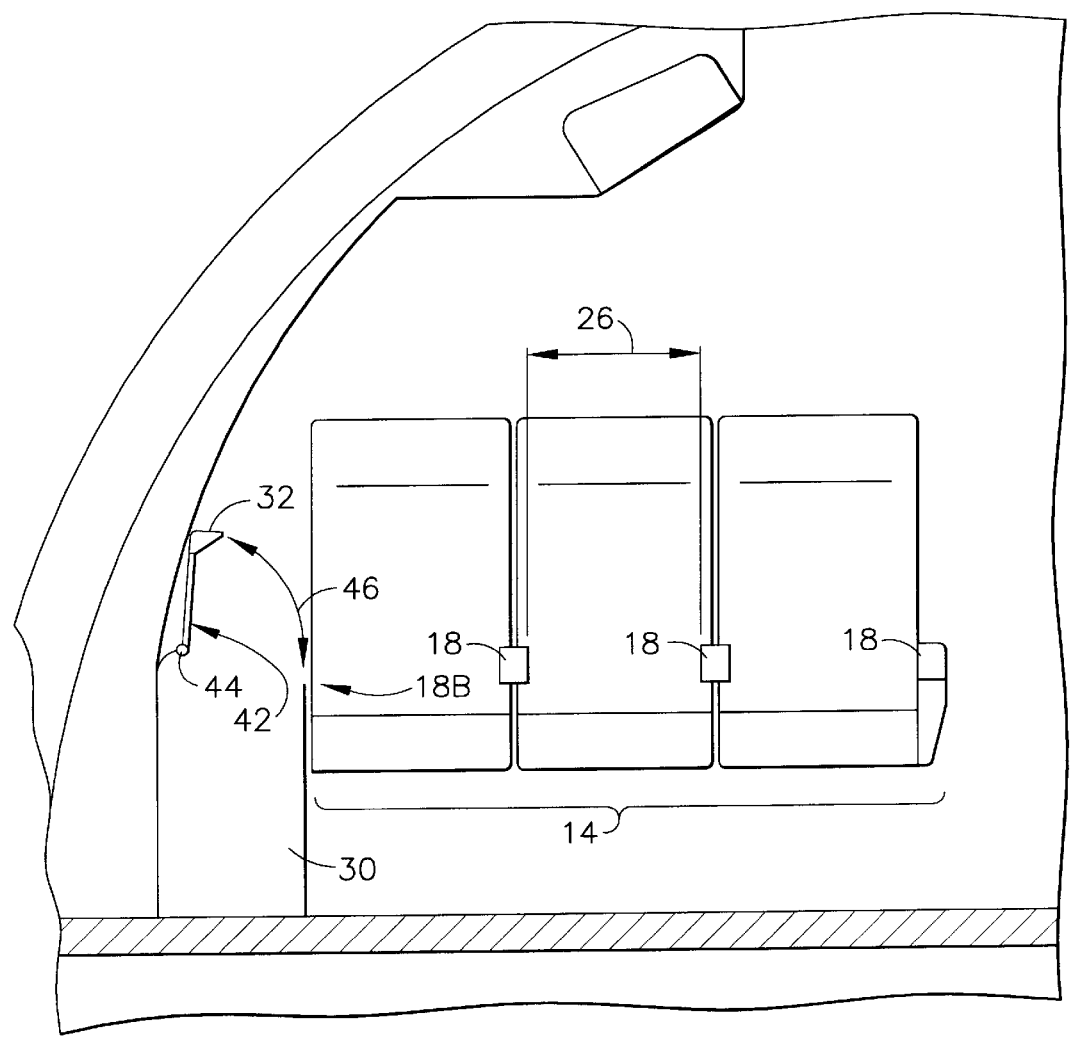
FIG. 4 is another magnified cross sectional view of a Boeing 747 upper deck (on the opposing side of the airplane)

FIG. 4, also illustrates a magnified cross sectional view of a Boeing 747 upper deck, but showing the left side triple seating unit 14, including three conventionally configured armrests 18. The fourth armrest for the outboard 18B seat may be floor bin mounted armrest 32, and is shown in the floor bin lid 42 open position, as it rotates about hinge 44 along arc 46.

FIG. 5 illustrates an alternate embodiment of the inventive floor bin supported armrest 32. It is shown in the floor bin lid 42 open position as it rotates about hinge 44 along arc 46. For this embodiment, the floor bin mounted armrest 32 may be supported by the floor bin vertical member 48, thus permitting continued use of the floor bin mounted armrest 32 despite the fact that the floor bin lid 42 is in the open position.

Another alternate embodiment (not shown) may involve use of the inventive floor storage bin arm rests on aircraft and other passenger conveyance means that use other than a triple seating unit. The inventive armrests may be used advantageously for single seating units as well as any plurality of seating units.

The embodiments shown and addressed herein are specifically illustrated as being used on the upper deck of a Boeing 747 type aircraft. However, the inventive floor bin supported armrest concept may be of equal benefit for other similar types of passenger conveyance means, including other types of aircraft, buses, trains, vans, or the like, having floor mounted storage bins on the outboard (away-from-aisle) sides of the seating units.

Although the present invention has been described in considerable detail with reference to certain versions thereof, other versions are possible. Therefore, the spirit and scope of the appended claims should not be limited to the description of the versions contained therein.

I claim:

1. An aircraft passenger abreast seating arrangement, comprising:

a triple passenger abreast seating unit;

seat mounted armrests on both sides of the two inboard seats of said triple passenger abreast seating unit;

a seat mounted armrest on the inboard side of the outboard seat of said triple passenger abreast seating unit and the outboard seat of said triple passenger abreast seating unit having no attached armrest on the outboard side of the outboard seat of said triple passenger abreast seating unit;

a floor storage bin located between the outboard seat of said triple passenger abreast seating unit and the outboard internal side wall of a passenger aircraft's cabin;

one armrest supported on the inboard upper corner of said floor storage bin, said one armrest at or above the height of said seat mounted armrests and said seat mounted armrest, and said one armrest for use by the passenger occupying the outboard seat of said triple passenger abreast seating unit;

whereby use of said floor storage bin armrest provides about two inches of additional usable width with respect to conventional aircraft that have triple passenger abreast seating units with attached armrests mounted on both sides of each seat in the seating unit, said additional usable width being distributed on each side of an aircraft's cross section, said additional usable width enabling at least one of an increase in seat bottom width or an increase in aisle width.

2. The aircraft passenger abreast seating arrangement of claim 1, further comprising a floor storage bin substantially rectangular in cross section, situated outboard of said seat in said passenger cabin; said floor storage bin also having two vertical wall elements on the inboard and outboard sides, and having hinged lids openable by passengers for storage of personal articles.

3. The aircraft passenger seating arrangement of claim 2, wherein said floor storage bin extends longitudinally along a sidewall of said cabin at substantially all longitudinal locations wherein seating is installed.

4. The aircraft passenger abreast seating arrangement of claim 2, further comprising a floor storage bin having a height from floor to lid substantially equal to the height of said seat mounted armrests on the triple passenger abreast seating unit.

5. The aircraft passenger abreast seating arrangement of claim 2, further comprising an armrest supported on the inboard upper corner of the lid of said floor storage bin.

6. The aircraft passenger abreast seating arrangement of claim 2, further comprising an armrest supported on the inboard upper corner of the lid of said floor mounted storage bin, said armrest having suitable cushioning and contouring for passenger comfort.

7. The aircraft passenger abreast seating arrangement of claim 2, further comprising an armrest supported on the upper end of the inboard vertical element of said floor storage bin, whereby said armrest remains stationary when the lid of said floor storage bin is opened.

8. The aircraft passenger abreast seating arrangement of claim 2, further comprising an armrest supported on the upper end of the inboard vertical element of said floor storage bin, said armrest having suitable cushioning and contouring for passenger comfort, and whereby said armrest remains stationary when the lid of said floor storage bin is opened.

9. An aircraft passenger abreast seating arrangement, comprising:
    a triple passenger abreast seating unit having no attached armrest on the outboard side of the outboard seat of said triple passenger abreast seating unit;
    seat mounted armrests on all but the outboard side of the outboard seat of said triple passenger abreast seating unit;
    one armrest supported at or above the height of said seat mounted armrests on the inboard upper corner of a floor storage bin for use by the passenger occupying the outboard seat of said triple abreast seating unit;
    whereby use of said floor storage bin armrest provides additional usable width with respect to conventional aircraft that have triple passenger abreast seating units with attached armrests mounted on both sides of each seat in the seating unit, said additional usable width being distributed on each side of an aircraft's cross section, allowing increased seat bottom and aisle widths.

10. The aircraft passenger abreast seating arrangement of claim 9, further comprising a floor storage bin, having vertical wall elements on the inboard and outboard sides, and having an openable hinged lid.

11. The aircraft passenger abreast seating arrangement of claim 9, further comprising a floor storage bin having approximately the same height as seat mounted armrests on said triple passenger abreast seating unit.

12. The aircraft passenger abreast seating arrangement of claim 9, further comprising an armrest mounted on the lid of said floor storage bin.

13. The aircraft passenger abreast seating arrangement of claim 9, further comprising an armrest mounted on the lid of said floor storage bin, said armrest having suitable cushioning and contouring.

14. The aircraft passenger abreast seating arrangement of claim 9, further comprising an armrest mounted to said floor storage bin, such that it remains stationary when the lid of said floor storage bin is opened.

15. The aircraft passenger abreast seating arrangement of claim 9, further comprising a cushioned and contoured armrest mounted to said floor storage bin such that it remains stationary when the lid of said floor storage bin is opened.

16. A passenger abreast seating arrangement, comprising:
    a passenger abreast seating unit including at least one outboard seat;
    seat mounted armrests on all but the outboard side of the outboard seat and the outboard side of the outboard seat having no attached armrest;
    one armrest mounted to a floor storage bin at or above the height of said seat mounted armrests for use by the passenger occupying the outboard seat of said passenger abreast seating unit;
    whereby use of said floor storage bin mounted armrest provides additional usable width with respect to conventional aircraft that have passenger abreast seating units with attached armrests mounted on both sides of each seat in the seating unit, said additional usable width being distributed on each side of a passenger vehicle's cross section, allowing at least one of an increased seat bottom width or an increased aisle width.

17. The passenger seating arrangement of claim 16, wherein said passenger vehicle's cross section tapers inwardly at increased height above a floor of said passenger vehicle.

18. A method of increasing the usable width on each side of an aircraft's cross section, said method comprising the steps of:
    mounting passenger armrests on both sides of each seat of a triple passenger abreast seating unit except for the outboard side of the outboard seat having no attached armrest;
    mounting one armrest at or above the height of said passenger armrests on the inboard upper corner of a floor storage bin adjacent the outboard seat of said triple abreast seating unit;
    providing additional usable width with respect to conventional aircraft that have triple passenger abreast seating units with attached armrests mounted on both sides of each seat in the seating unit, said additional usable width being distributed on each side of an aircraft's cross section by eliminating one seat mounted armrest, thus allowing an increase in at least one of seat bottom width or aisle width.

19. The method of increasing the usable width on each side of an aircraft's cross section of claim 18, further comprising the step of mounting one armrest at or above the height of said passenger armrests on the inboard upper corner of a floor storage bin such that the armrest remains stationary and usable when the floor bin lid is opened.

* * * * *